United States Patent [19]
Gellert

[11] Patent Number: 5,952,016
[45] Date of Patent: Sep. 14, 1999

[54] SIDE GATED INJECTION MOLDING APPARATUS WITH ACTUATED MANIFOLD

[76] Inventor: Jobst Ulrich Gellert, 7A Prince Street, Georgetown, Ontario, Canada, L7G 2X1

[21] Appl. No.: 08/978,863

[22] Filed: Nov. 28, 1997

[30] Foreign Application Priority Data

Nov. 13, 1997 [CA] Canada ................................ 2221425

[51] Int. Cl.$^6$ ................................................ B29C 45/22
[52] U.S. Cl. ........................ 425/190; 425/549; 425/572
[58] Field of Search ................................ 425/185, 190, 425/191, 192 R, 572, 549

[56] References Cited

U.S. PATENT DOCUMENTS 4,786,246  11/1988  Gellert .
4,981,431   1/1991  Schmidt .
5,494,433   2/1996  Gellert ................................ 425/549
5,591,465   1/1997  Babin .
5,820,899  10/1998  Gellert et al. ........................ 425/549

*Primary Examiner*—Tim Heitbrink
*Attorney, Agent, or Firm*—Dalesman & Company

[57] ABSTRACT

Multi-cavity injection molding apparatus having several side gate seals seated around the front end of each heated nozzle. Actuating mechanism is provided to advance the melt distribution manifold and the attached nozzles to a forward position without removing the mold from the molding machine. In this position, the front ends of the heated nozzles protrude from the mold to facilitate removal of the side gate seals and hot tip torpedoes for cleaning or replacement.

4 Claims, 3 Drawing Sheets

5,952,016

SIDE GATED INJECTION MOLDING APPARATUS WITH ACTUATED MANIFOLD

BACKGROUND OF THE INVENTION

This invention relates generally to injection molding and more particularly to side gated apparatus having a plurality of heated nozzles extending from a melt distribution manifold which can be actuated to a forward position to facilitate installation and removal of side gate seals adjacent the front end of each heated nozzle.

Side gating from heated nozzles seated in openings in a mold through hollow side gate seals to cavities surrounding each heated nozzle is well known. However, as seen in U.S. Pat. No. 4,981,431 to Schmidt which issued Jan. 1, 1991, previously the side gate seals were first mounted on a heated nozzle and the heated nozzle was then inserted into place in an opening in the mold. This arrangement has the disadvantage that the outer ends of the seals cannot extend outwardly past the inner surface of the opening in the mold. Consequently, the cavities must be located very close to the heated nozzle. While this is suitable for some configurations, it is not satisfactory for applications where space for an additional cooling conduit is required around each cavity.

U.S. Pat. No. 5,591,465 to Babin which issued Jan. 7, 1997 discloses side gated apparatus wherein the manifold and heated nozzles can be advanced to a forward position to facilitate installation of the side gate seals. However, this apparatus has the disadvantage that there is no provision to return the melt distribution manifold and heated nozzles to the forward position to facilitate removal of the side gate seals for cleaning or replacement after the apparatus has been operating for some time.

As seen in the applicant's U.S. Pat. No. 4,786,246 which issued Nov. 22, 1988, valve gated apparatus using pistons to reciprocate heated nozzles attached to a melt distribution manifold between a retracted open and forward closed positions is known. However, those heated nozzles must have forwardly extending tips to provide the valve gating and the movement of the heated nozzles is part of the operating cycle so there is no way it can be transposed into apparatus having the combination of side gate seals and provision for removing them for cleaning or replacement.

SUMMARY OF THE INVENTION

Accordingly, it is an object of the present invention to at least partially overcome the disadvantages of the prior art by providing injection molding apparatus having the combination of side gate seals mounted adjacent the front end of each heated nozzle and actuating mechanism to advance the melt distribution manifold and the heated nozzles extending therefrom to a forward position to facilitate removal of the side gate seals for cleaning or replacement.

To this end, in one of its aspects, the invention provides a side gated injection molding apparatus having a plurality of heated nozzles and a heated melt distribution manifold mounted in a mold with each heated nozzle extending forwardly from the heated melt distribution manifold into an opening in the mold. The heated nozzle has a rear end, a front end and a generally cylindrical outer surface extending rearwardly from the front end. The opening in the mold has a generally cylindrical inner surface with an insulative air space provided between the outer surface of the heated nozzle and the inner surface of the opening in the mold. The heated nozzle has a melt channel extending therethrough to convey melt to fill a plurality of cavities spaced in the mold around the opening. The melt channel has a central portion extending from the rear end of the heated nozzle and a plurality of radial portions branching outwardly from the central portion adjacent the front end of the heated nozzle. Each radial portion of the melt channel extends in alignment with a gate leading to one of the cavities. The apparatus includes the combination of a plurality of spaced hollow side gate seals and an actuating mechanism. Each side gate seal has an inner end, an outer end, and a bore therebetween. The inner end is seated in the heated nozzle with each side gate seal extending outwardly across the insulative air space in alignment between a respective radial portion of the melt channel and a respective gate to convey melt outwardly from the melt channel to the gate to fill the cavity. The actuating mechanism can advance the melt distribution manifold and the heated nozzles a sufficient distance forwardly from a retracted operating position to facilitate installation and removal of the side gate seals.

Further objects and advantages of the invention will appear from the following description taken together with the accompanying drawings.

DETAILED DESCRIPTION OF THE INVENTION

Figure 1:
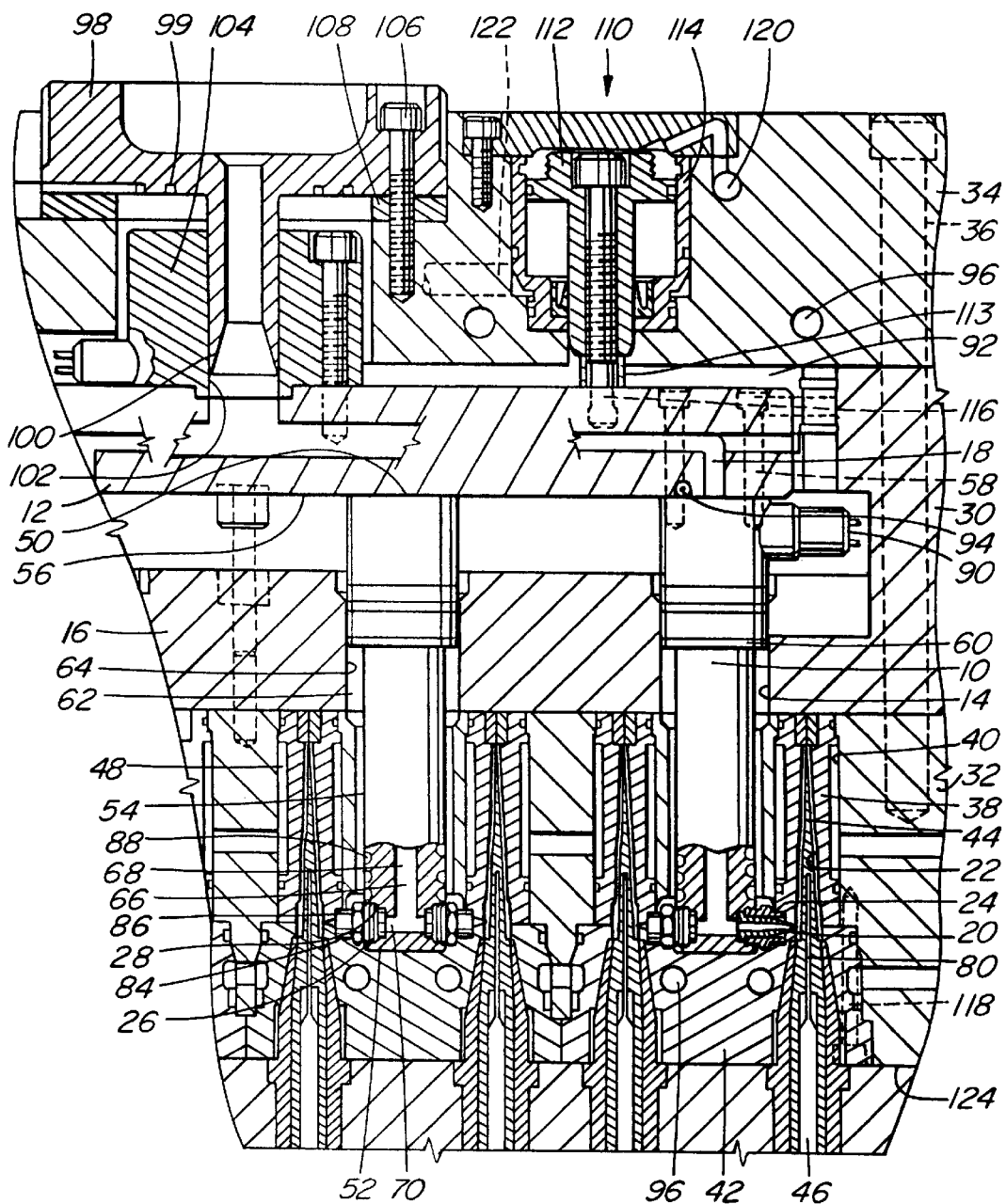
FIG. 1 is a sectional view of a portion of a side gated injection molding system in the closed position according to one embodiment of the invention.

Reference is first made to FIG. 1 which shows a portion of a side gated multi-cavity injection molding system or apparatus in which several heated steel nozzles 10 extend from a heated steel melt distribution manifold 12 forwardly into generally cylindrical openings 14 in a mold 16 to convey pressurized melt through a melt passage 18 to several gates 20 spaced around each heated nozzle 10. Each gate 20 leads to an elongated cavity 22 and is aligned with a hollow side gate seal 24 having a threaded inner end 26 screwed into a threaded seat 28 in the heated nozzle 10.

While molds can have a wide variety of configurations, in this case a manifold retainer plate 30 is mounted between a cavity retainer plate 32 and a back plate 34 which are secured together by screws 36 in a conventional manner. In this configuration, each elongated cavity 22 is formed between a cavity insert 38 retained in a hole 40 in the cavity retainer plate 32 by a retainer insert 42 and a tapered cavity core 44 with a central cooling conduit 46. Cooling water is also pumped through cooling conduits 48 extending around each cavity insert 38 to provide cooling between the heated nozzles 10 and the cavities 22.

Each heated nozzle 10 has a rear end 50, a front end 52 and a cylindrical outer surface 54 extending rearwardly from the front end 52. The rear end 50 of each heated nozzle 10 is secured to the front face 56 of the melt distribution manifold 12 by screws 58. Each heated nozzle 10 also has an insulation and location flange portion 60 which fits in the cylindrical opening 14 in the manifold retainer plate 30. This accurately locates the heated nozzle 10 centrally between the surrounding cavities 22 and provides an insulative air space 62 between the outer surface 54 of the heated nozzle 10 and the surrounding cylindrical inner surface 64 of the cylindrical opening 14. Each heated nozzle 10 has a melt channel 66 with a central portion 68 extending from the rear end 50 to a number of radial portions 70 each of which branches outwardly to the threaded seat 28 adjacent the front end 52 of the heated nozzle 10 into which the inner end 26 of the side gate seal 24 is screwed.

Figure 2:
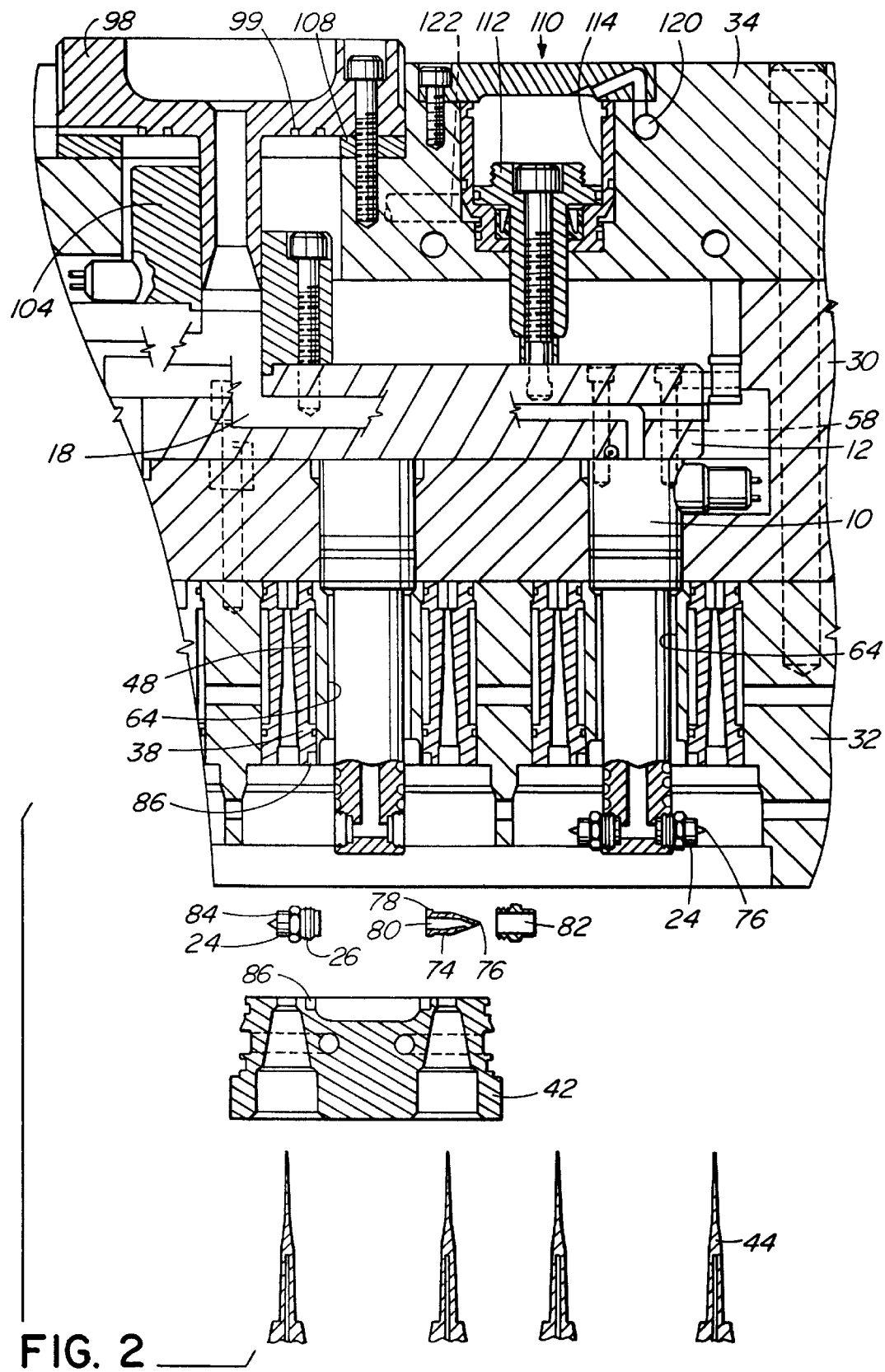
FIG. 2 is a similar view of the same apparatus in the open position showing how the side gate seals are removed.

As also seen in FIG. 2, in this embodiment, hollow torpedoes 74, each with a pointed tip 76, a rear flange 78 and a bore 80 therethrough are secured in place around the front end 52 of each heated nozzle 10 by screwing the side gate seals 24 into the threaded seats 28. While the torpedoes 74 and side gate seals 24 are separate components in this embodiment, in other embodiments a pointed tip can be an integral part of each side gate seal. Each radial portion 70 of the melt channel 76 extends outwardly to a bore 82 through one of the side gate seals 24 and the bore 80 through the torpedo 74 seated in the side gate seal 24 which has a pointed tip 76 aligned with one of the gates 20 leading to one of the cavities 22. In this embodiment, each gate 20 is formed half by the cavity insert 38 and half by the retainer insert 42. Each side gate seal 24 has an outer end 84 which is received in a seat 86 formed between the cavity insert 38 and the retainer insert 42 in alignment with the gate 20. The outer end 84 of each side gate seal 24 extends outwardly past the inner surface 64 of the opening 14 a sufficient distance to provide room for the cooling conduits 48 extending around the cavity inserts 38. Each nozzle 10 is heated by an integral electrical heating element 88 which extends around the central portion 68 of the melt channel 66 and has an external terminal 90. A thermocouple element (not shown) extends into the heated nozzle 10 near its front end 52 to control the operating temperature.

The steel melt distribution manifold 12 extends between the manifold retainer plate 30 and the back plate 34. An insulative air space 92 is provided between the melt distribution manifold 12 which is heated by an integral electrical heating element 94 and the surrounding manifold retainer plate 30 and back plate 34 which are cooled by pumping cooling water through cooling conduits 96. The melt passage 18 receives melt from a molding machine (not shown) through a locating ring 98 which is heated by an integral heating element 99 and is seated in the back plate 34. The locating ring 98 has a snorkel 100 projecting into a central inlet 102 in a cylindrical inlet portion 104 of the melt distribution manifold 12 to allow for movement of the manifold 12 and the heated nozzles 10. The locating ring 98 is secured in place by screws 106 which extend through an insulation ring 108 formed of a suitable ceramic material into the back plate 34. The melt passage 18 branches in the melt distribution manifold 12 to the melt channels 66 in the heated nozzles 10.

In this embodiment, pneumatic actuating mechanism 110 comprising pistons 112 and cylinders 114 are mounted in the back plate 34. Each piston 112 has a screw 116 which extends through a titanium insulating ring 113 forwardly into the melt distribution manifold 12. When it is necessary to remove one or more of the side gate seals 24 for cleaning or replacement, the mold 16 is stopped in the open position shown in FIG. 2, and the retainer inserts 42 are removed by unscrewing screws 118. Pneumatic pressure is then applied to the pistons 112 through lines 120 to drive the melt distribution manifold 12 and the attached heated nozzles 10 forwardly from the operating position shown in FIG. 1 to the forward position shown in FIG. 2 in which the melt distribution manifold 12 abuts against the manifold retainer plate 30. As can be seen in FIG. 2, in this forward position the front end 52 of each heated nozzle 10 extends a sufficient distance forwardly from the cavity plate 32 to allow the side gate seals 24 to be unscrewed for removal with the torpedoes 74. After the cleaning or replacement of the side gate seals 24 and/or the torpedoes 74, the heated nozzles 10 can be retracted to the operating position shown in FIG. 1 by applying pneumatic pressure through lines 122. However, this retraction feature is optional as the heated nozzles 10 can be manually pushed back to the operating position during replacement of the retainer inserts 42. Thus, the actuating mechanisms 110 make it possible to remove the side gate seals 24 and torpedoes 74 while the mold is still on the molding machine.

In use, after assembly as is shown in FIG. 1, electrical power is applied to the heating element 99 in the locating ring 98, the heating element 94 in the melt distribution manifold 12, and the heating element 88 in the heated nozzles 10 to heat them to a predetermined operating temperature. The mold is cooled by pumping cooling water through the cooling conduits 46, 48 and 96. The heated nozzles 10 are retained in place by the outer ends 84 of the side gate seals 24 being engaged in the seats 86 between the cavity inserts 38 and the retainer inserts 42. Thermal expansion of the heated nozzle 10 and the melt distribution manifold 12 when they are heated is accommodated by the snorkel 100 moving in the central inlet 102 of the melt passage 18. While pneumatic actuating mechanisms 110 are shown, of course hydraulic or electro-mechanical actuating mechanisms can be used for other applications. Pressurized melt is applied from a molding machine (not shown) through the snorkel 100 to the central inlet 102 of the melt passage 18 according to a predetermined cycle. Melt flows through the melt distribution manifold 12, heated nozzles 10, side gate seals 24, torpedoes 74 and gates 20 into the cavities 22. After the cavities 22 are filled and a suitable packing and cooling period has expired, the injection pressure is released and the mold 16 is opened to eject the molded products. After ejection, the mold 16 is closed and the cycle is repeated continuously with a cycle time depending upon the wall thickness and the number and size of the cavities 22 and the type of material being molded.

Figure 3:
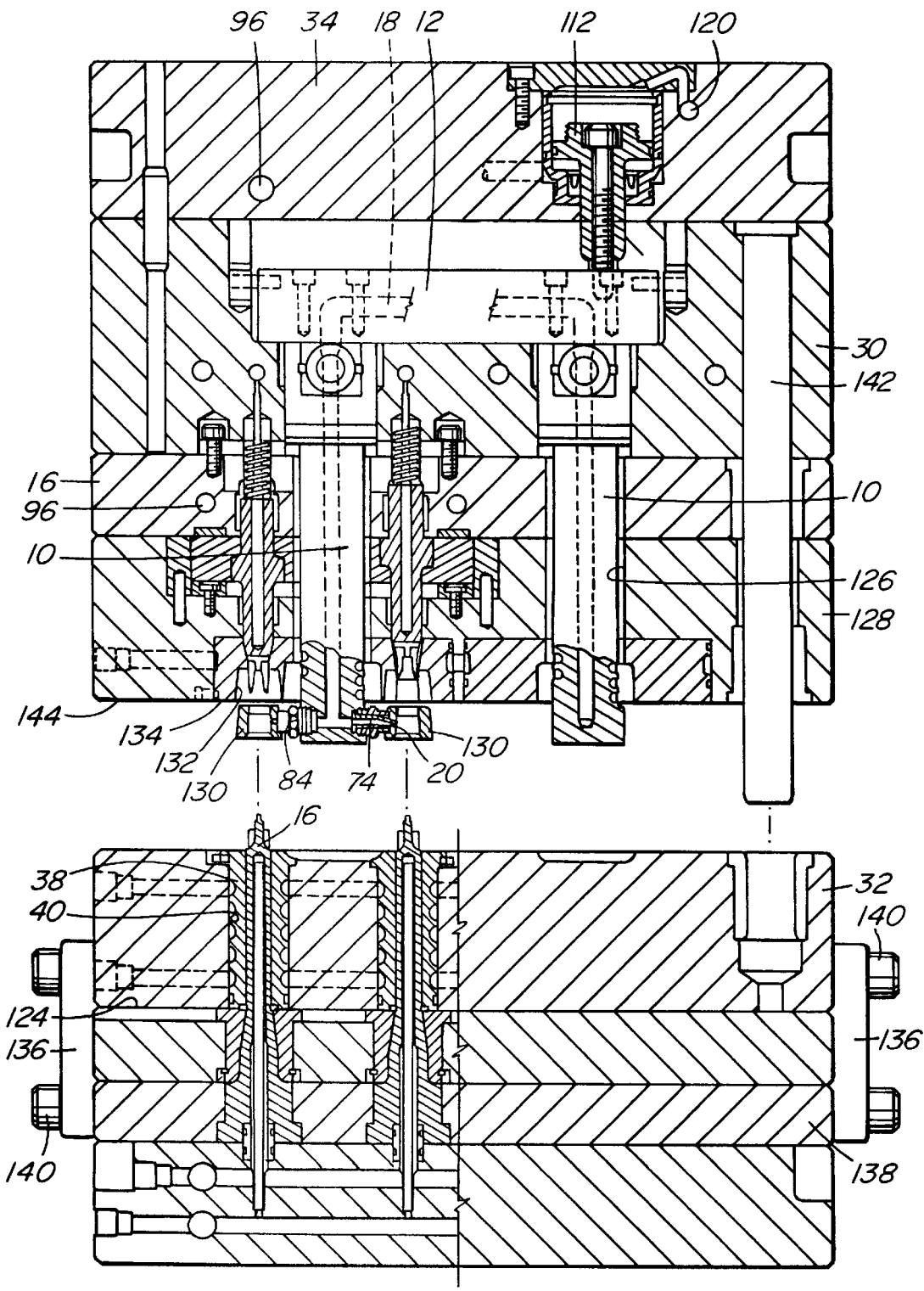
FIG. 3 is a similar view of side gated injection molding apparatus in the open position according to another embodiment of the invention.

Reference is now made to FIG. 3 showing side gated injection molding apparatus according to another embodiment of the invention. As many of the elements are the same or similar to those described above, not all elements common to both embodiments are described again and those that are described again have the same reference numerals as before. In this case, the mold 16 is different because the cavities 22 for making parts such as syringes preferably have the gates 20 near the top of the part and not close to the parting line 124. In this configuration, the heated nozzles 10 extend through openings 126 in the separate mold plate 128 and the cavity inserts 38 are received in holes 40 in the cavity plate 32. The outer end 84 of each side gate seal 24 and the pointed tip 76 of the torpedo 74 extend into a gate insert 130 to form the gate 20. Each gate insert 130 is received in a seat 132 in the front face 134 of the mold plates 128.

When it is necessary to remove the side gate seals 24 for cleaning or replacement, brackets 136 are temporarily attached between the cavity plate 32 and the core retainer plate 138 by screws 140 to prevent the mold 16 opening along the parting line 124. The mold 16, which is kept in alignment by leader pins 142, is then opened along the cavity split line 144 as shown in FIG. 3. The melt distribution manifold 12 and the attached heated nozzles 10 are then advanced to the forward position by applying pneumatic pressure to the pistons 112 through lines 120. As seen in FIG. 3, this allows the gate inserts 130 to be removed from their seats 132 for cleaning. The side gate seals 24 with the torpedoes 74 are then unscrewed from the front ends 52 of the heated nozzles 10 for cleaning or replacement. The gate inserts 130 are then replaced, the mold 16 is closed, the brackets 136 are removed and operation as described above recommences.

While the description of the injection molding apparatus having side gates and actuating mechanism has been given with respect to preferred embodiments, it will be evident that various other modifications are possible without departing from the scope of the invention as understood by those skill in the art and as defined in the following claims.

The embodiments of the invention in which an exclusive property or privilege is claimed is defined as follows:

1. In a side gated injection molding apparatus having a plurality of heated nozzles and a heated melt distribution manifold mounted in a mold with each heated nozzle extending forwardly from the heated melt distribution manifold into an opening in the mold, the heated nozzle having a rear end, a front end and a generally cylindrical outer surface extending rearwardly from the front end, the opening in the mold having a generally cylindrical inner surface with an insulative air space provided between the outer surface of the heated nozzle and the inner surface of the opening in the mold, the heated nozzle having a melt channel extending therethrough to convey melt to fill a plurality of cavities spaced in the mold around the opening, the melt channel having a central portion extending from the rear end of the heated nozzle and a plurality of radial portions branching outwardly from the central portion adjacent the front end of the heated nozzle, each radial portion of the melt channel extending in alignment with a gate leading to one of the cavities, the improvement comprising;

the combination of a plurality of spaced hollow side gate seals, each having an inner end, an outer end, and a bore therebetween, the inner end being seated in the heated nozzle with each side gate seal extending outwardly across the insulative air space in alignment between a respective radial portion of the melt channel and a respective gate to convey melt outwardly from the melt channel to the gate to fill the cavity, and actuating means to advance the melt distribution manifold and the heated nozzles a sufficient distance forwardly from a retracted operating position to facilitate installation and removal of the side gate seals.

2. In a side gated injection molding apparatus as claimed in claim 1 wherein the heated melt distribution manifold has a melt passage which branches therein from a snorkel at a central inlet to a plurality of outlets, each outlet aligned with the central portion of the melt channel through one of the heated nozzles.

3. In a side gated injection molding apparatus as claimed in claim 2 wherein the inner end of each side gate seal is threaded and the side gate seals are screwed into threaded seats spaced adjacent the front end of each nozzle.

4. In a side gated injection molding apparatus as claimed in claim 3 wherein each side gate seal retains a torpedo having a pointed tip in place with the pointed tip aligned with one of the gates.

* * * * *